(12) United States Patent
Gam

(10) Patent No.: US 10,500,798 B2
(45) Date of Patent: Dec. 10, 2019

(54) METHOD OF FORMING CARBON-FIBER PRODUCT AND IMPLEMENTATION DEVICE THEREOF

(71) Applicant: Star Leader Trading Limited, Central (HK)

(72) Inventor: Wei-Te Gam, Taichung (TW)

(73) Assignee: STAR LEADER TRADING LIMITED, Central (HK)

( * ) Notice: Subject to any disclaimer, the term of this patent is extended or adjusted under 35 U.S.C. 154(b) by 282 days.

(21) Appl. No.: 15/353,065

(22) Filed: Nov. 16, 2016

(65) Prior Publication Data
US 2018/0036969 A1    Feb. 8, 2018

(30) Foreign Application Priority Data

Aug. 5, 2016   (TW) .................................. 105211852

(51) Int. Cl.
*B29C 70/46* (2006.01)
*B29C 33/50* (2006.01)
(Continued)

(52) U.S. Cl.
CPC .............. *B29C 70/46* (2013.01); *B29C 33/02* (2013.01); *B29C 33/505* (2013.01); *B29C 70/06* (2013.01); *B29C 70/44* (2013.01); *B29C 70/446* (2013.01); *B29C 70/54* (2013.01); *B29K 2063/00* (2013.01); *B29K 2105/0872* (2013.01); *B29K 2105/253* (2013.01)

(58) Field of Classification Search
None
See application file for complete search history.

(56) References Cited

U.S. PATENT DOCUMENTS

| 5,108,532 A | * | 4/1992 | Thein ..................... B29C 43/203 156/285 |
| 5,229,562 A | * | 7/1993 | Burnett .................. B21D 26/02 219/602 |

(Continued)

*Primary Examiner* — Monica A Huson
(74) *Attorney, Agent, or Firm* — Muncy, Geissler, Olds & Lowe, P.C.

(57) ABSTRACT

A carbon-fiber product forming device is disclosed. The device includes a first chamber forming with a hollow cavity, a hot-pressing plate disposed inside the hollow cavity, a mold disposed on the hot-pressing plate and formed with an outward opening, an air bag disposed inside a mold cavity of the mold, provided with a bag opening disposed near the outward opening, and attached on an outer surface thereof with carbon-fiber composites, a second chamber mounted on one side surface of the first chamber and disposed on wall surface with an air extracting port, an air inlet port, a heat medium entry port, and a barometric port, and a plurality of barometric pipes included inside the second chamber. Two ends of each of the barometric pipes are connected to the barometric port and the outward opening, respectively, such that the air bag could be periodically injected with air. A heat medium is injected into the inside of the hot-pressing plate when the air inside the hollow cavity is extracted by a vacuum pump via the air extracting port. The accordingly made carbon-fiber product has residual-air-removing rate of preferably above 99% and structural strength improvement of at least 5%.

11 Claims, 4 Drawing Sheets

(51) Int. Cl.
     *B29C 70/44*         (2006.01)
     *B29C 33/02*         (2006.01)
     *B29C 70/06*         (2006.01)
     *B29C 70/54*         (2006.01)
     B29K 63/00         (2006.01)
     B29K 105/08       (2006.01)
     B29K 105/00       (2006.01)

(56)           References Cited

U.S. PATENT DOCUMENTS 5,297,480 A  *  3/1994  Miyashita ............... B29C 33/02
                                                               100/320
    6,906,300 B2 *  6/2005  Brown .................... B29C 70/46
                                                                219/602

\* cited by examiner

METHOD OF FORMING CARBON-FIBER PRODUCT AND IMPLEMENTATION DEVICE THEREOF

CROSS-REFERENCE TO RELATED APPLICATIONS

The present application claims the benefit of TW patent application Ser. No. 105211852, filed on Aug. 5, 2016, and which is incorporated herein by reference in its entirety.

TECHNICAL FIELD

The present disclosure relates to a method and a device of forming carbon-fiber product, and more particularly to a method and a device of forming carbon-fiber product without generating airs inside the carbon-fiber product.

BACKGROUND

Carbon-fiber products which are made of carbon-fiber composite including carbon-fibers, resins, metals, and ceramics are widely used in aerospace, military, and electronic industries. Typical carbon-fiber products forming methods include pressing molding, manual layer-up coating, vacuum bag hot pressing, filament winding, and pultrusion. Pressing molding is a process including putting a resin pre-impregnated carbon-fiber composite into a metal mold, pressing the resin pre-impregnated carbon-fiber composite to evacuate surplus resins, solidifying the resin pre-impregnated carbon-fiber composite in high temperature environment, and removing the metal mold to get the product. Manual layer-up coating is a process including layering up a plurality of sheets of shaped glue pre-impregnated carbon-fiber composites and simultaneously coating them with resins, and hot pressing them to get the product. Vacuum bag hot pressing is a process including layering up a plurality of sheets of carbon-fiber composites inside a mold, covering a heat-resistant thin film on the composites, swelling a soft air bag to exert force on the layered composites, and solidifying the composites in an autoclave. Filament winding is a process of winding carbon-fiber filaments on a carbon-fiber axis. Pultrusion is a process of completely impregnating carbon-fibers in resins and removing surplus resins and airs through extrusion and solidifying the carbon-fibers into product in a furnace.

The above-mentioned methods however incur airs resided during processing inside the carbon-fiber composites and therefore cause the obtained product to blister due to the residual airs or air traps and reduce structural strength of the obtained product. There is therefore a need to create an improved carbon-fiber product forming device of completely removing the residual airs inside the carbon-fiber composites and reinforcing the structural strength of the carbon-fiber product thus formed.

SUMMARY

In order to solve the above-mentioned issues, the present disclosure provides a carbon-fiber product forming device which has simple structure and is capable of removing residual airs inside the carbon-fiber product with a removing rate of at least 80%.

In one embodiment, a carbon-fiber product forming device may include a first chamber, at least two hot-pressing plates, a mold, an air bag, and a second chamber. The first chamber may include a hollow cavity and a first entire wall enclosing the hollow cavity. The hot-pressing plates may be disposed inside the hollow cavity with each of the hot-pressing plates being formed with a plurality of through holes which are connected to a plurality of conduits, respectively. The mold may include a male mold, a female mold, and a mold cavity being formed between the male mold and the female mold and with an outward opening. The mold may be disposed on one of the hot-pressing plates and between the hot-pressing plates. The air bag may be disposed inside the mold cavity and may include a bag opening disposed near the outward opening. The second chamber may be mounted on one side surface of the first entire wall of the first chamber and formed with an accommodating room to include at least one barometric pipe and with a second entire wall enclosing the accommodating room. The accommodating room may be in mutual communication with the hollow cavity. The second entire wall of the second chamber may be disposed with an air extracting port, a barometric port, a switchable air inlet port, and a switchable heat medium entry port. The air extracting port may be connected to a vacuum pump. One end of the barometric pipe may be connected to the barometric port while the other end of the barometric pipe may be connected to the outward opening. The barometric port may be connected to an air source, and the air inlet port may be exposed to atmosphere when switched on. One side of the heat medium entry port may be connected to the conduits while the other side of the heat medium entry port may be connected to a heat medium source.

Furthermore, the air bag may swell to have the same shape as that of a carbon-fiber product to be produced when the inside of the air bag is fulfilled with air; an outer surface of the air bag may be attached with a plurality of carbon-fiber composite layers; a heat medium coming from the heat medium source may be injected into the inside of the hot-pressing plates via the heat medium entry port, the conduits, and the through holes to enable the mold to have various temperature ranges starting from atmosphere temperature and including the glass transition temperature of the carbon-fiber composite layers; air inside the hollow cavity may be extracted by the vacuum pump via the air extracting port; air coming from the air source may be periodically conducted into the air bag via the barometric port, the barometric pipe, the outward opening, and the bag opening when the temperature of the mold starts to increase from atmosphere temperature to the glass transition temperature of the carbon-fiber composite layers; a cycle frequency of periodically conducting air into the air bag may vary as the temperature range within which the mold is changes; and the cycle frequency of periodically conducting air into the air bag may decrease as the air pressure inside the hollow cavity decreases.

In one embodiment, the temperature ranges of the mold include a first temperature range being from atmosphere temperature to 70 degrees Celsius, a second temperature range being from 70 degrees Celsius to 80 degrees Celsius, a third temperature range being from 80 degrees Celsius to 100 degrees Celsius, and a fourth temperature range being from 100 degrees Celsius to 150 degrees Celsius.

In one embodiment, the carbon-fiber product forming device may further include a driving unit disposed inside the hollow cavity and connected to the hot-pressing plates to drive the hot-pressing plates to move upward or downward and therefore to compress and seal the male mold and the female mold. For example, the driving unit may be an oil cylinder.

In one embodiment, the first entire wall of the first chamber may include a movable door.

In one embodiment, the second entire wall of the second chamber may include a movable door.

In one embodiment, two of the second chambers may be disposed at two sides of the entire wall of the first chamber, respectively, with the air extracting port and the barometric port being disposed on one of the second chamber at one side of the first chamber while the air inlet port and the heat medium entry port being disposed on the other one of the second chambers at the other side of the first chamber.

In one embodiment, each of the through holes of the hot-pressing plates may extend to the inside of the hot-pressing plates.

In one embodiment, the heat medium entry port may be disposed at a bottom surface of the second entire wall.

In one embodiment, the carbon-fiber product forming device may further include a controlling unit connected to the first chamber and/or the heat medium source and/or the air source and/or the vacuum pump to control the temperature of the mold, the air pressure inside the hollow cavity, and the cycle frequency of periodically conducting air into the air bag.

In one embodiment, the controlling unit may a programmable logic controller.

In one embodiment, the mold may be in a type suitable for an air-bag molding, a pressing molding, a resin-transfer molding, or a vacuum-infusion processing molding.

In another embodiment, a method of forming carbon-fiber product may include a step of controlling the air pressure inside the hollow cavity to be at most 0.6 atm and controlling the cycle frequency of periodically conducting air into the air bag to be at least 20 times when the temperature of the mold ranges from atmosphere temperature to 60 degrees Celsius.

In another embodiment, the method of forming carbon-fiber product may further include a step of controlling the air pressure inside the hollow cavity to be at most 0.35 atm and controlling the cycle frequency of periodically conducting air into the air bag to be at least 5 times when the temperature of the mold ranges from 70 degrees Celsius to 75 degrees Celsius.

In another embodiment, the method of forming carbon-fiber product may still further include a step of controlling the air pressure inside the hollow cavity to be at most 0.1 atm and controlling the cycle frequency of periodically conducting air into the air bag to be at least 2 times when the temperature of the mold ranges from 80 degrees Celsius to 100 degrees Celsius.

In another embodiment, the method of forming carbon-fiber product may still further include a step of controlling the air pressure inside the hollow cavity to be near 0.01 atm, controlling the cycle frequency of periodically conducting air into the air bag to be zero, and controlling the air pressure inside the air bag to be between 5 kgf/cm$^2$ to 20 kgf/cm$^2$ when the temperature of the mold ranges from 110 degrees Celsius to 150 degrees Celsius.

In another embodiment, the method of forming carbon-fiber product may still further include a step of replacing the heat medium with a coolant of a temperature 10 degrees lower than that of the heat medium and injecting the coolant to the inside of the hot-pressing plates to cool down the mold.

The disclosed carbon-fiber product forming device utilizes mutual interaction between the variation of the vacuum degree inside the hollow cavity and the variation of the cycle frequency of periodically conducting air into the air bag to completely remove residual airs inside the carbon-fiber composites before the various temperature ranges of the mold reach the glass transition temperature Tg of the carbon-fiber composites.

The accordingly made carbon-fiber product has excellent strength, non-residual airs, stable quality, and more extensive application. Compared with well-known skills in the art, the disclosed carbon-fiber product forming device is capable of removing residual airs inside a carbon-fiber composite with a residual air removing rate up to 99% when the carbon-fiber composite which is pre-impregnated with resin and putted inside a mold is heated to undergo a resin polymerization process. As a result, the formed carbon-fiber product is prevented from blistering and the appearance therefore is improved and the structural strength thereof has at least 5% improvement.

BRIEF DESCRIPTION OF DRAWINGS

The following detailed descriptions, given with examples, are not intended to limit the present disclosure solely thereto, and will be best understood in conjunction with the accompanying figures.

DETAILED DESCRIPTION OF THE EMBODIMENTS

Figure 1:
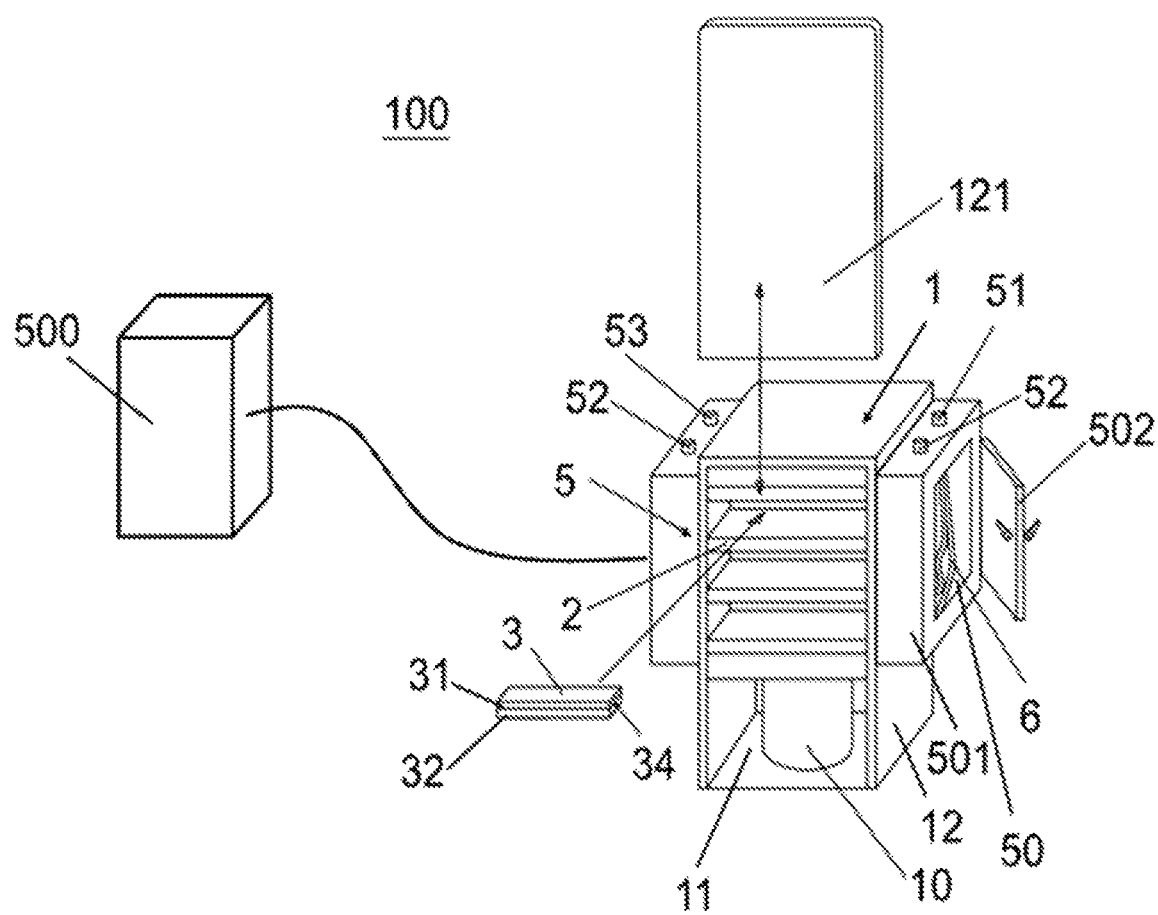
FIG. 1 is a perspective view schematically showing the interior and exterior structure of a carbon-fiber product forming device according to one embodiment of the present disclosure.
Figure 2:
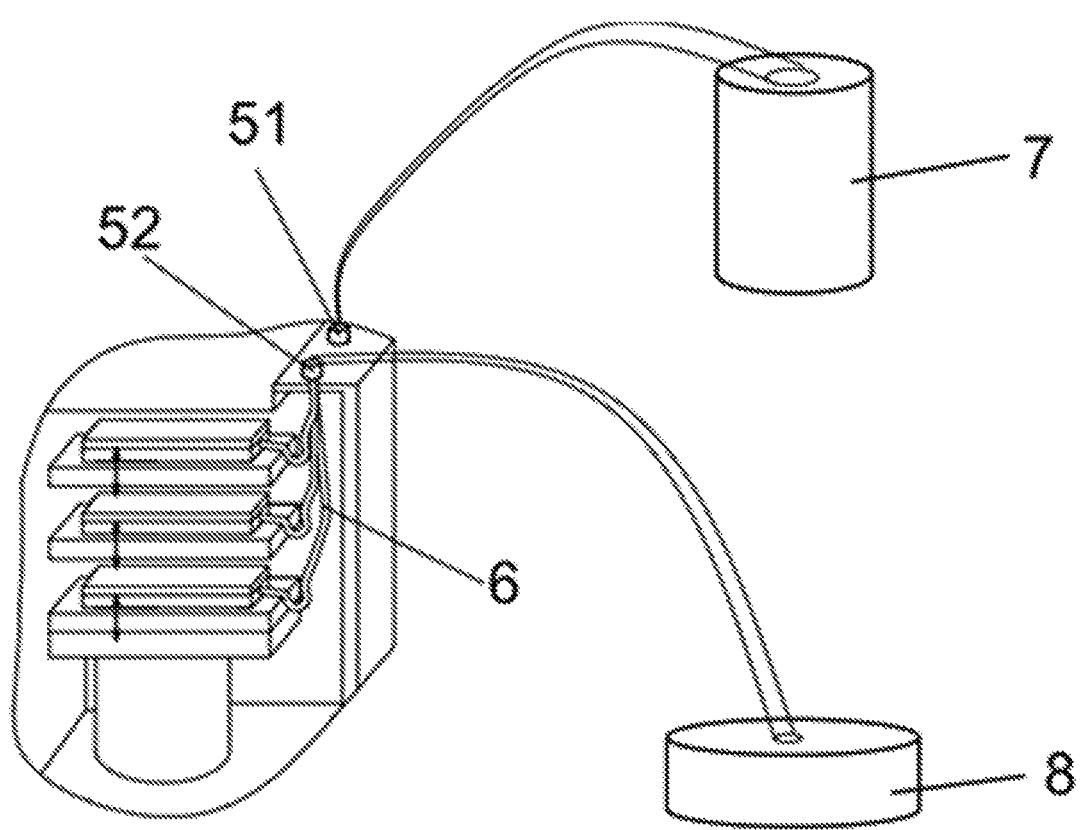
FIG. 2 is a perspective view schematically showing a barometric port and a plurality of barometric pipes of the carbon-fiber product forming device according to one embodiment of the present disclosure.

The following description and the accompanying schematically plotted drawings of the present disclosure are used to illustrate the main technical features of the disclosed carbon-fiber product forming device. The principles for manufacturing carbon-fiber product should be well-understood by those skilled in the art and will not be illustrated in detail.

Referring to FIGS. 1 to 4, a carbon-fiber product forming device 100 according to one embodiment of the present disclosure includes a first chamber 1, at least two hot-pressing plates 2, a mold 3, an air bag 4, and a second chamber 5. The first chamber 1 is formed with a hollow cavity 11 and an entire wall 12 to enclose and seal the hollow cavity 11. The hot-pressing plates 2 are disposed inside the hollow cavity 11 and each of the hot-pressing plates 2 is formed a plurality of through holes 21 extending from the outside of the hot-pressing plates 2 to the inside of the hot-pressing plates 2. The through holes 21 are connected to a plurality of conduits 22, respectively. The mold 3 is disposed on one of the hot-pressing plates 2 and between the two hot-pressing plates which are close to each other. The mold 3 has a male mold 31 and a female mold 32 with a mold cavity 33 being formed between the male mold 31 and the female mold 32 and having an outward opening 34. The outward opening 34 is exposed to the outside of the mold 3. The air bag 4 is disposed inside the mold cavity 33 and has a bag opening 41 which is disposed near the outward opening 34 such that any air entering the outward opening 34 directly enters the bag opening 41. The second chamber 5 is mounted on one side surface of the entire wall 12 of the first chamber 1 and formed with an accommodating room 50 to include at least one barometric pipe 6 and an entire wall 501 to enclose and seal the accommodating room 50. The accommodating room 50 is in mutual communication with the hollow cavity 11, and the entire wall 501 is disposed with an air extracting port 51, a barometric port 52, a switchable air inlet port 53, and a switchable heat medium entry port 54. The air extracting port 51 is connected to a vacuum pump 7, the barometric pipe 6 has one end which is connected to the barometric port 52 and the other end which is connected to the bag opening 41 and the outward opening 34, the barometric port 52 is connected to an air source 8, the air inlet port 53 is exposed to atmosphere when switched on, the heat medium entry port 54 has one side which is connected to the conduit 22 and the other side which is connected to a heat medium source 9. The heat medium mentioned here is directed to any kind of medium capable of providing energies with different temperatures such as vapors, hot kerosene, or coolant. The heat medium source 9 is a room or container to store the heat medium. The hot-pressing plates 2 perform functions of supporting, clamping, and tightly pressing the mold 3 and are not limited in numbers. The air inlet port 53 is to be closed after the male mold 31 and the female mold 32 being combined together and compressed and before the male mold 31 and the female mold 32 being separated.

A plurality of carbon-fiber composite layers 30 are attached on an outer surface of the air bag 4. The heat medium coming from the heat medium source 9 is injected into the inside of each one of the hot-pressing plates 2 via the heat medium entry port 54, the conduits 22 and the through holes 21 such that the temperature of the mold 3 could be adjusted to gradually increase from atmosphere temperature and have various specified ranges. Air coming from the air source 8 enters the air bag 4 via the barometric port 52, the barometric pipe 6, the outward opening 34 of the mold cavity 33, and the bag opening 41. Air inside the air bag 4 may be automatically evacuated out via the bag opening 41, the outward opening 34, the barometric pipe 6, and the barometric port 52. A cycle frequency of periodically conducting air into the air bag 4 varies as the temperature range of the mold 3 changes. The air inside the hollow cavity 11 is extracted by the vacuum pump 7 via the air extracting port 51, and the air pressure inside the hollow cavity 11 depends on the specified temperature range in which the mold 3 is set. Especially, the cycle frequency of periodically conducting air into the air bag 4 decreases as the air pressure inside the hollow cavity 11 decreases or a vacuum degree inside the hollow cavity 11 increases.

Moreover, the air bag 4 swells to have the same shape as that of a carbon-fiber product to be produced when the inside of the air bag 4 is fulfilled with air. Each of the carbon-fiber composite layers 30 is pre-impregnated in an epoxy resin and then attached to the outer surface of the air bag 4. The air bag 4 is disposed inside the mold cavity 33 when all of the carbon-fiber composite layers 30 are completely attached onto the outer surface of the air bag 4. Air with pressure of 5 kgf/cm$^2$ to 20 kgf/cm$^2$ is injected into the air bag 4 to make the air bag 4 swelled and thus force all of the carbon-fiber composite layers 30 to adhere to the wall surface enclosing the mold cavity 33 when the male mold 31 and the female mold 32 are tightly compressed. The carbon-fibers and the epoxy resin of the carbon-fiber composite layers 30 are fused when the temperature of the mold 3 is increased to reach a degree suitable for resin polymerization, and then the carbon-fiber composite layers 30 are solidified into a carbon-fiber product of a predetermined shape when the mold 3 is cooled to ambient temperature.

Referring to FIG. 1, in one embodiment, the carbon-fiber product 100 further includes a driving unit 10 disposed inside the hollow cavity 11 and connected to the hot-pressing plates 2. The driving unit 10 functions to drive the hot-pressing plates 2 to move upward or downward and therefore to clamp the mold 3 between two adjacent hot-pressing plates 2 and compress and seal the male mold 31 and the female mold 32. The heat of the hot-pressing plates 2 above and below the mold 3 could therefore be transferred to the mold 3 and which enables temperature increasing of the mold 3. The driving unit 10 may be any device or equipment cable of providing powers to move the hot-pressing plates 2 such as an oil cylinder. The entire wall 12 of the first chamber 1, which is a main body of the whole carbon-fiber product forming device 100, must be able to completely seal the hollow cavity 11. In one embodiment, the entire wall 12 may be composed of five continuous fixed sub-walls and a movable door 121 which facilitates open-up of the hollow cavity 11 and disposal of the mold 3 inside the hollow cavity 11. In other embodiments, the entire wall 12 may be formed in other manners as long as the hollow cavity 11 could be completely sealed when the hollow cavity 11 is closed.

Similarly, the second chamber 5 is designed as a sealed chamber to accommodate the barometric pipes 6 and have various of kinds of air inlet ports and air outlet ports. Except that one side of the second chamber 5 is in communication with the hollow cavity 11, the other sides of the second chamber 5 which forms the entire wall 501 enclosing the accommodating room 50 must be able to completely seal the accommodating room 50 when the accommodating room 50 is closed. In one embodiment, the entire wall 501 may be composed of four fixed sub-walls and a movable door 502 which facilitates open-up of the accommodating room 50 and disposal of the barometric pipes 6 inside the accommodating room 50. In other embodiments, the entire wall 501 may be formed in other manners as long as the accommodating room 50 could be completely sealed when the accommodating room 50 is closed.

Figure 3:
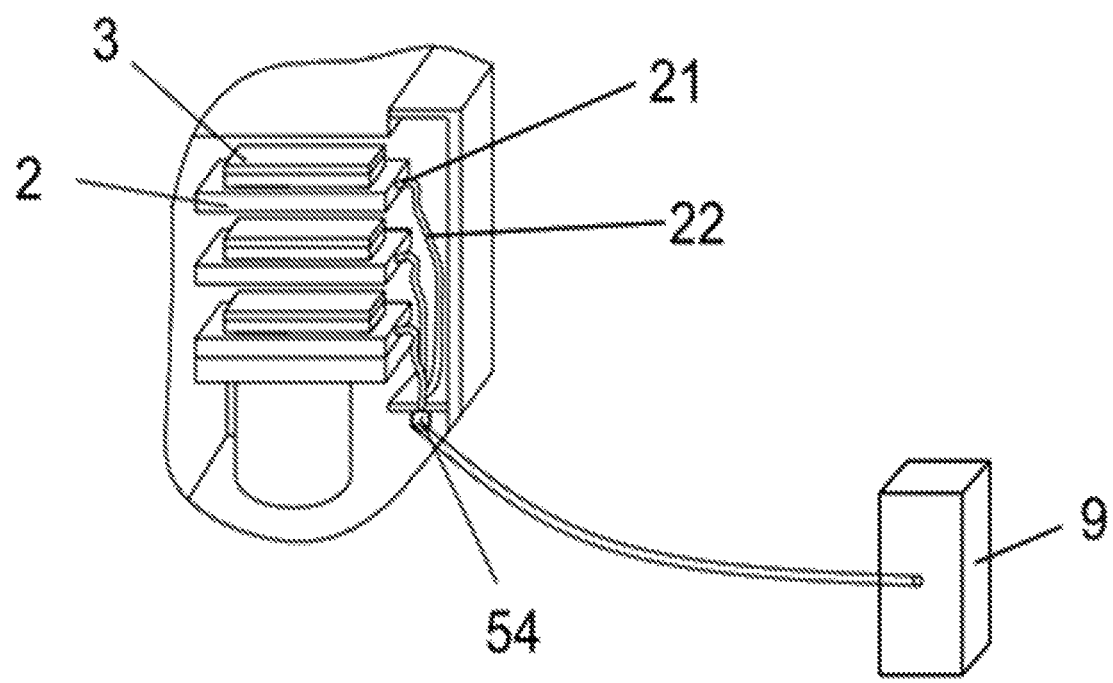
FIG. 3 is a perspective view schematically showing hot medium entry ports and conduits of the carbon-fiber product forming device according to one embodiment of the present disclosure.
Figure 4:
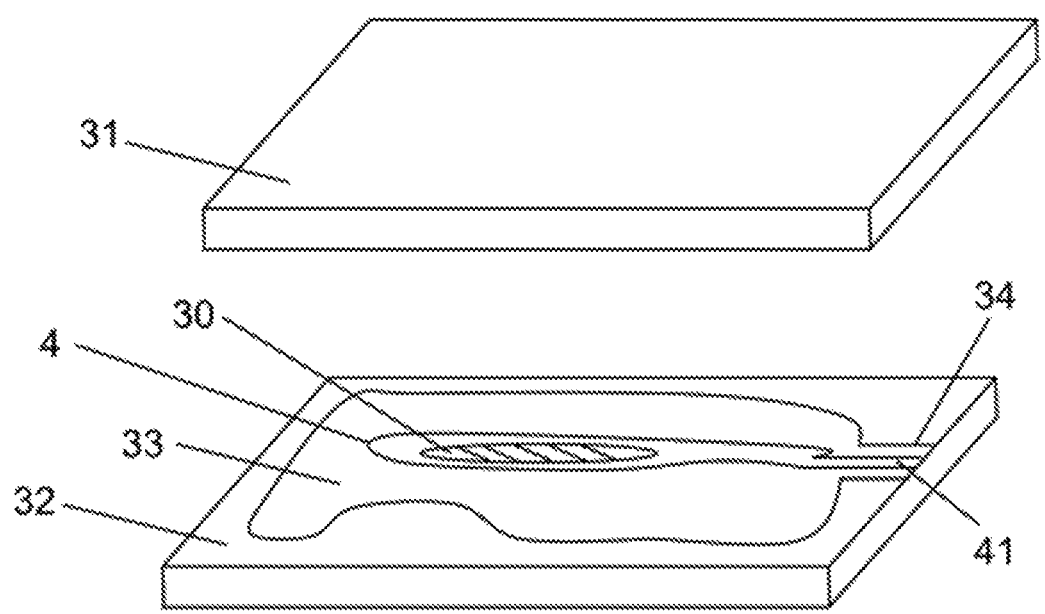
FIG. 4 is a perspective view schematically showing a mold, an air bag, and carbon-fiber composite layers of the carbon-fiber product forming device according to one embodiment of the present disclosure.

Referring to FIG. 1 and FIG. 3, in one embodiment, two of the second chambers 5 are disposed at two sides of the entire wall 12 of the first chamber 1, respectively. The air extracting port 51 and the barometric port 52 are disposed on the second chamber at one side of the first chamber 1, while the air inlet port 53 and the heat medium entry port 54 are disposed on the second chamber at the other side of the first chamber 1. In another embodiment, it is also acceptable that only one of the second chamber 5 is disposed and that the air extracting port 51, the barometric port 52, the air inlet port 53, and the heat medium entry port 54 are all disposed on the only one second chamber 5. In other embodiments, more than two of the second chambers 5 may be provided, and the air extracting port 51, the barometric port 52, the air inlet port 53, and the heat medium entry port 54 are disposed on different second chambers 5, respectively. In one embodiment, the heat medium entry port 54 may be selectively disposed at a bottom surface of the entire wall 501 of the second chamber 5. The conduit 22 is a pipe to transfer heat medium or coolant with different temperature degrees such as a metallic pipe.

In one embodiment, the mold 3 may be in a type suitable for an air-bag molding, a pressing molding, a resin-transfer molding, or a vacuum-infusion processing molding.

In one embodiment, the carbon-fiber product forming device 100 further includes a controlling unit 500 which may be connected to the first chamber 1, the mold 3, the vacuum pump 7, the air source 8, and/or the heat medium source 9 to control the temperature of the mold 3, the air pressure (or the vacuum degree) and/or temperature inside the hollow cavity 11, and/or the cycle frequency of periodically conducting air into the air bag 4. The controlling unit 500 may be a programmable logic controller (PLC) for example.

In one embodiment, a method of forming carbon-fiber product by using the above-disclosed carbon-fiber product forming device includes the following steps: (1)opening up the movable door 121 and placing the mold 3 onto a hot-pressing plate 2; (2)opening up the movable door 502 and connecting one end of the barometric pipe 6 to the outward opening 34 and/or the bag opening 41; (3)driving the hot-pressing plates 2 to move toward the mold 3 and therefore clamp the mold 3; (4)closing the movable door 121 and the movable door 502; (5)switching on the heat medium entry port 54 and injecting the heat medium from the heat medium source 9 to the inside of the hot-pressing plates 2; (6)actuating the controlling unit 500 to control the temperature of the mold 3 and the air pressure (or the vacuum degree) and temperature inside the hollow cavity 11 and the cycle frequency of periodically conducting air into the air bag 4 within various specified temperature ranges of the mold 3 such that the air pressure and temperature inside the hollow cavity 11 and the cycle frequency of periodically conducting air into the air bag 4 vary with the change of the temperature of the mold 3. In one embodiment, the air pressure inside the hollow cavity 11 may be controlled to be at most 0.6 atm (i.e. standard atmosphere pressure) and the cycle frequency of periodically conducting air into the air bag 4 may be simultaneously controlled to be at least 20 times when the temperature of the mold 3 or the hollow cavity 11 is within a range starting from room temperature (or atmosphere temperature) to 70 degrees Celsius. The air pressure inside the hollow cavity 11 may be controlled to be at most 0.35 atm and the cycle frequency of periodically conducting air into the air bag 4 may be simultaneously controlled to be at least 5 times when the temperature of the mold 3 or the hollow cavity 11 is within a range starting from 60 degrees Celsius to 80 degrees Celsius. The air pressure inside the hollow cavity 11 may be controlled to be at most 0.1 atm and the cycle frequency of periodically conducting air into the air bag 4 may be simultaneously controlled to be at least 2 times when the temperature of the mold 3 or the hollow cavity 11 is within a range starting from 75 degrees Celsius to 110 degrees Celsius. The air pressure inside the hollow cavity 11 may be controlled to be at most 0.1 atm and preferably near 0.01 atm and the cycle frequency of periodically conducting air into the air bag 4 may be simultaneously controlled to be zero and the air pressure inside the air bag 4 may be controlled to be between 5 kgf/cm$^2$ to 20 kgf/cm$^2$ when the temperature of the mold 3 or the hollow cavity 11 is within a range starting from 100 degrees Celsius to 150 degrees Celsius; (7)replacing the heat medium with a coolant of a temperature 10 degrees lower than that of the heat medium and injecting the coolant to the inside of the hot-pressing plates 2 for a while to cool down the mold 3; (8)stopping injection of the coolant and switching on the air inlet port 53 to allow the outside air to enter the hollow cavity 11; (9)opening up the movable door 121 and the movable door 502, removing the barometric pipe 6 from the outward opening 34 and/or the bag opening 41, and taking out the mold 3 from the hollow cavity 11; (10)opening the mold 3 to expose the carbon-fiber product and remove the carbon-fiber product from the mold 3. The accordingly made carbon-fiber product has a residual air removing rate of at least 80% and preferably above 99% and even up to 100%.

The above-mentioned are merely preferred embodiments of the present disclosure, and shall not be used to limit the scope of the appended claims. Further, those skilled in the art will understand from the description set forth, and practice the present disclosure according thereto. Thus, other equivalent alterations and modifications which are completed without departing from the spirit disclosed by the present disclosure should be included in the scope of the appended claims.

What is claimed is:

1. A carbon-fiber product forming device, comprising:
a first chamber including a hollow cavity and a first entire wall enclosing the hollow cavity;
at least two hot-pressing plates disposed inside the hollow cavity with each of the hot-pressing plates being formed with a plurality of through holes being connected to a plurality of conduits, respectively;
a mold including a male mold, a female mold, and a mold cavity being formed between the male mold and the female mold and with an outward opening, the mold being disposed on one of the hot-pressing plates and between the hot-pressing plates;
an air bag disposed inside the mold cavity with the air bag including a bag opening disposed near the outward opening, the air bag swelling to have the same shape as that of a carbon-fiber product to be produced when the inside of the air bag is fulfilled with air; and
a second chamber formed with an accommodating room to include at least one barometric pipe and with a second entire wall enclosing the accommodating room, the accommodating room being in mutual communication with the hollow cavity, the second entire wall of the second chamber being disposed with an air extracting port, a barometric port, a switchable air inlet port, and a switchable heat medium entry port, the air extracting port being connected to a vacuum pump, one end of the barometric pipe being connected to the barometric port while the other end of the barometric pipe being connected to the outward opening, the barometric port being connected to an air source, the air inlet port being exposed to atmosphere when switched on, one side of the heat medium entry port being connected to the conduits while the other side of the heat medium entry port being connected to a heat medium source;
wherein an outer surface of the air bag is to be attached with a plurality of carbon-fiber composite layers; a heat medium from the heat medium source is to be injected into the inside of the hot-pressing plates via the heat medium entry port, the conduits, and the through holes to enable the mold to have various temperature ranges starting from room temperature and including the glass transition temperature of the carbon-fiber composite layers; air inside the hollow cavity is to be extracted by the vacuum pump via the air extracting port; air coming from the air source is to be periodically conducted into the air bag via the barometric port, the barometric pipe, the outward opening, and the bag opening when the temperature of the mold starts to increase from room temperature to the glass transition temperature of the carbon-fiber composite layers; a cycle frequency of periodically conducting air into the air bag varies as the temperature ranges within which the mold is changes; and the cycle frequency of periodically conducting air into the air bag decreases as the air pressure inside the hollow cavity decreases.

2. The carbon-fiber product forming device of claim 1, wherein the temperature ranges of the mold include a first temperature range being from room temperature to 70 degrees Celsius, a second temperature range being from 70 degrees Celsius to 80 degrees Celsius, a third temperature range being from 80 degrees Celsius to 100 degrees Celsius, and a fourth temperature range being from 100 degrees Celsius to 150 degrees Celsius.

3. The carbon-fiber product forming device of claim 1, further comprising;
   a driving unit disposed inside the hollow cavity and connected to the hot-pressing plates to drive the hot-pressing plates to move upward or downward and therefore to compress and seal the male mold and the female mold.

4. The carbon-fiber product forming device of claim 1, wherein the first entire wall of the first chamber includes a movable door.

5. The carbon-fiber product forming device of claim 1, wherein the second entire wall of the second chamber includes a movable door.

6. The carbon-fiber product forming device of claim 1, wherein two of the second chambers are disposed at two sides of the entire wall of the first chamber, respectively, with the air extracting port and the barometric port being disposed on one of the second chamber at one side of the first chamber while the air inlet port and the heat medium entry port being disposed on the other one of the second chambers at the other side of the first chamber.

7. The carbon-fiber product forming device of claim 1, wherein each of the through holes of the hot-pressing plates extending to the inside of the hot-pressing plates.

8. The carbon-fiber product forming device of claim 1, wherein the heat medium entry port is disposed at a bottom surface of the second entire wall.

9. The carbon-fiber product forming device of claim 1, further comprising:
   a controlling unit connected to one of the first chamber, the heat medium source, the air source, and the vacuum pump to control the temperature of the mold, the air pressure inside the hollow cavity, and the cycle frequency of periodically conducting air into the air bag.

10. The carbon-fiber product forming device of claim 9, wherein the controlling unit is a programmable logic controller.

11. A carbon-fiber product forming method implemented by a carbon-fiber product forming device including
    a first chamber including a hollow cavity and a first entire wall enclosing the hollow cavity;
    at least two hot-pressing plates disposed inside the hollow cavity with each of the hot-pressing plates being formed with a plurality of through holes being connected to a plurality of conduits, respectively;
    a mold including a male mold, a female mold, and a mold cavity being formed between the male mold and the female mold and with an outward opening, the mold being disposed on one of the hot-pressing plates and between the hot-pressing plates;
    an air bag disposed inside the mold cavity with the air bag including a bag opening disposed near the outward opening, the air bag swelling to have the same shape as that of a carbon-fiber product to be produced when the inside of the air bag is fulfilled with air; and
    a second chamber formed with an accommodating room to include at least one barometric pipe and with a second entire wall enclosing the accommodating room, the accommodating room being in mutual communication with the hollow cavity, the second entire wall of the second chamber being disposed with an air extracting port, a barometric port, a switchable air inlet port, and a switchable heat medium entry port, the air extracting port being connected to a vacuum pump, one end of the barometric pipe being connected to the barometric port while the other end of the barometric pipe being connected to the outward opening, the barometric port being connected to an air source, the air inlet port being exposed to atmosphere when switched on, one side of the heat medium entry port being connected to the conduits while the other side of the heat medium entry port being connected to a heat medium source;
    wherein an outer surface of the air bag is to be attached with a plurality of carbon-fiber composite layers; a heat medium from the heat medium source is to be injected into the inside of the hot-pressing plates via the heat medium entry port, the conduits, and the through holes to enable the mold to have various temperature ranges starting from room temperature and including the glass transition temperature of the carbon-fiber composite layers; air inside the hollow cavity is to be extracted by the vacuum pump via the air extracting port; air coming from the air source is to be periodically conducted into the air bag via the barometric port, the barometric pipe, the outward opening, and the bag opening when the temperature of the mold starts to increase from the room temperature to the glass transition temperature of the carbon-fiber composite layers; a cycle frequency of periodically conducting air into the air bag varies as the temperature ranges within which the mold is changes; and the cycle frequency of periodically conducting air into the air bag decreases as the air pressure inside the hollow cavity decreases,
    the method comprising:
    controlling the air pressure inside the hollow cavity to be near 0.01 atm, controlling the cycle frequency of periodically conducting air into the air bag to be zero, and controlling the air pressure inside the air bag to be between 5 kgf/cm$^2$ to 20 kgf/cm$^2$ when the temperature of the mold increases from 110 degrees Celsius to 150 degrees Celsius; and
    replacing the heat medium with a coolant of a temperature 10 degrees lower than that of the heat medium and injecting the coolant to the inside of the hot-pressing plates to cool down the mold.

\* \* \* \* \*